US012713231B2

(12) United States Patent
Cao et al.

(10) Patent No.: US 12,713,231 B2
(45) Date of Patent: Aug. 18, 2026

(54) COMMUNICATION CHANNEL MANAGEMENT METHODS AND APPARATUSES

(71) Applicant: Alipay (Hangzhou) Information Technology Co., Ltd., Hangzhou (CN)

(72) Inventors: Hongjian Cao, Hangzhou (CN); Wanqiao Zhang, Hangzhou (CN); Lin Huang, Hangzhou (CN); Yunding Jian, Hangzhou (CN); Wei Fu, Hangzhou (CN); Yujia Liu, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 141 days.

(21) Appl. No.: 18/520,123

(22) Filed: Nov. 27, 2023

(65) Prior Publication Data

US 2024/0098488 A1 Mar. 21, 2024

Related U.S. Application Data

(63) Continuation of application No. PCT/CN2022/105248, filed on Jul. 12, 2022.

(30) Foreign Application Priority Data

Aug. 19, 2021 (CN) ........................ 202110957050.9

(51) Int. Cl.
*H04W 12/03* (2021.01)
*H04W 12/041* (2021.01)

(52) U.S. Cl.
CPC ......... *H04W 12/03* (2021.01); *H04W 12/041* (2021.01)

(58) Field of Classification Search
CPC ... H04W 12/03; H04W 12/041; H04W 12/50; H04W 84/12
See application file for complete search history.

(56) References Cited

U.S. PATENT DOCUMENTS 7,120,138 B2 * 10/2006 Soomro ................ H04W 72/02 370/329
9,820,131 B2 * 11/2017 Abraham ............. H04W 76/00
(Continued)

FOREIGN PATENT DOCUMENTS

CN 1864384 11/2006
CN 1968261 A 5/2007
(Continued)

OTHER PUBLICATIONS

Translation of Zhiwei (WO 2020/011276A1) (Published Jan. 16, 2020) (translated Jun. 12, 2025) (Year: 2020).*
(Continued)

*Primary Examiner* — Sharon S Lynch
(74) *Attorney, Agent, or Firm* — Fish & Richardson P.C.

(57) ABSTRACT

A computer-implemented method for communication channel management performed by a wireless access point (AP) device is described. An original management frame that carries a target information element is constructed, where the target information element includes an information element related to communication channel management. When determined that one or more clients are connected to the AP device, for each of the determined clients: A destination address of the original management frame is set to a MAC address of the client. To obtain an encrypted management frame by using a key corresponding to the client, information in the target information element is encrypted. The encrypted management frame is sent in a WiFi network, so that a connected client in the WiFi network determines, based on the destination address, whether to process the encrypted management frame.

17 Claims, 8 Drawing Sheets

(56) References Cited

U.S. PATENT DOCUMENTS

| | | | | |
|---|---|---|---|---|
| 9,992,680 | B2 * | 6/2018 | Liu | H04L 63/08 |
| 10,049,000 | B2 * | 8/2018 | Thoukydides | H04L 1/0083 |
| 10,492,139 | B2 * | 11/2019 | Yang | H04W 52/0229 |
| 11,297,496 | B2 * | 4/2022 | Doyle | H04L 9/0833 |
| 11,330,519 | B1 * | 5/2022 | Shukla | H04W 12/06 |
| 12,081,967 | B2 * | 9/2024 | Murugesan | H04L 9/0827 |
| 2003/0002456 | A1 * | 1/2003 | Soomro | H04W 72/02 370/328 |
| 2003/0063593 | A1 | 4/2003 | Koyanagi et al. | |
| 2007/0189528 | A1 * | 8/2007 | Ueda | H04W 12/033 380/44 |
| 2009/0232313 | A1 | 9/2009 | Eun et al. | |
| 2014/0198725 | A1 * | 7/2014 | Abraham | H04W 76/00 370/328 |
| 2015/0289164 | A1 * | 10/2015 | Seok | H04W 52/0209 370/311 |
| 2017/0019785 | A1 * | 1/2017 | Liu | H04L 63/08 |
| 2017/0111469 | A1 * | 4/2017 | Kishore | H04L 67/303 |
| 2017/0185474 | A1 * | 6/2017 | Thoukydides | H04L 67/568 |
| 2017/0311218 | A1 | 10/2017 | Zhang | |
| 2018/0063788 | A1 * | 3/2018 | Yang | H04W 12/108 |
| 2020/0077258 | A1 * | 3/2020 | Doyle | H04L 63/0428 |
| 2021/0076437 | A1 | 3/2021 | Kneckt et al. | |
| 2022/0060898 | A1 * | 2/2022 | Liu | H04L 9/30 |
| 2022/0322081 | A1 * | 10/2022 | Murugesan | H04L 9/3215 |
| 2023/0319925 | A1 * | 10/2023 | Montemurro | H04W 76/15 370/329 |

FOREIGN PATENT DOCUMENTS

| | | | | |
|---|---|---|---|---|
| CN | 101137139 A | | 3/2008 | |
| CN | 101272379 | | 9/2008 | |
| CN | 101395835 | | 3/2009 | |
| CN | 101616412 | | 12/2009 | |
| CN | 101848463 | | 9/2010 | |
| CN | 101959188 | | 1/2011 | |
| CN | 101986726 | | 3/2011 | |
| CN | 102404720 | | 4/2012 | |
| CN | 102750750 | | 10/2012 | |
| CN | 104244248 | | 12/2014 | |
| CN | 104333862 | | 2/2015 | |
| CN | 105049422 | | 11/2015 | |
| CN | 105142207 | | 12/2015 | |
| CN | 105635185 | | 6/2016 | |
| CN | 106412883 | | 2/2017 | |
| CN | 107846685 | | 3/2018 | |
| CN | 107995671 | | 5/2018 | |
| CN | 108282551 | | 7/2018 | |
| CN | 109104744 | | 12/2018 | |
| CN | 110650476 | | 1/2020 | |
| CN | 111083804 | | 4/2020 | |
| CN | 111278036 | | 6/2020 | |
| CN | 111954270 | | 11/2020 | |
| CN | 112737718 X | | 4/2021 | |
| CN | 113613245 | | 11/2021 | |
| WO | WO 2006120316 | | 11/2006 | |
| WO | WO 2014/040432 | * | 3/2014 | H04W 36/24 |
| WO | 2014169670 A1 | | 10/2014 | |
| WO | WO 2020011276 | | 1/2020 | |

OTHER PUBLICATIONS

Valli Kumari et al., Formal Verification of IEEE 802.11w authentication protocol, 2nd International Conference on Communication, Computing & Security, Procedia Technology 716-722 (2012) (Year: 2012).*

Translation of WO 2014/040432 (Year: 2014).*

IEEE Standard for Information technology—Part 11: Wireless LAN Medium Access Control (MAC) and Physical Layer (PHY) Specifications; IEEE Std 802.11™-2007; pp. 1, 3, 217-220 (Jun. 12, 2007) (Year: 2007).*

Extended European Search Report in European Appln. No. 22857477.8, mailed on Sep. 23, 2024, 11 pages.

Intel Corporation, "Connection management aspects for NR V2X SL," 3GPP TSG-RAN WG2 Meeting 103bis R2-1814056, Chengdu, China, Oct. 8-12, 2018, 3 pages.

International Preliminary Report on Patentability in in Appln. No. PCT/CN2022/105248, mailed on Feb. 29, 2024, 12 pages (with English translation).

International Search Report and Written Opinion in Appln. No. PCT/CN2022/105248, mailed on Sep. 1, 2022, 14 pages (with English translation).

802.11 Wireless Networks: The Definitive Guide, 2nd ed., Gast, Dec. 2007, pp. 93-124, 90 pages (with machine translation).

Li et al., "Security enhancement of 802.11i by wireless physical layer key," Journal of Jiangsu University (Natural Science Edition), Jul. 2013, 34(4):416-421 (with English abstract).

Meng et al., "EPON key security by design," Optical Communication Technology, Jan. 8, 2007, pp. 14-16, 6 pages (with English abstract).

Zhang et al., "Research of Improved Security Mechanism for WLAN," Communications Technology, May 2008, 14(5):197, 3 pages (with English abstract).

* cited by examiner

| Octet: 1 | 1 | 1 | 1 | 1 |
|---|---|---|---|---|
| Element identifier | Length | Channel switch mode | New channel number | Channel switch count |

FIG. 4

COMMUNICATION CHANNEL MANAGEMENT METHODS AND APPARATUSES

CROSS-REFERENCE TO RELATED APPLICATIONS

This application is a continuation of PCT Application No. PCT/CN2022/105248, filed on Jul. 12, 2022, which claims priority to Chinese Patent Application No. 202110957050.9, filed on Aug. 19, 2021, and each application is hereby incorporated by reference in its entirety.

TECHNICAL FIELD

Embodiments of this specification relate to the field of computer technologies, and in particular, to communication channel management methods and apparatuses.

BACKGROUND

With the development of wireless communication, more devices are connected to a network via WiFi, to implement intelligent functions. Open characteristic of WiFi communication provides convenience for a terminal device to be connected to a wireless network, and also provides an opportunity for an attacker. The attacker can forge and replay any frame in the wireless network. This poses a great threat to user information security. For example, a beacon frame is used as a beacon frame of a wireless access point (wireless AP), and is usually transmitted in plaintext. Anyone can eavesdrop on and forge the beacon frame. When the attacker forges and replays information related to a communication channel in the beacon frame, a client connected to the WiFi network will be attacked. For example, after the client receives the malformed information related to the communication channel in the beacon frame, network connection interruption or system crash may be caused due to a data parsing error. For another example, after the client receives the forged information related to the communication channel in the beacon frame, the client performs an incorrect instruction to switch a channel, causing connection interruption or a man-in-the-middle attack.

Therefore, it is expected that an improved solution can be provided to improve security of WiFi communication.

SUMMARY

Embodiments of this specification describe communication channel management methods and apparatuses. At a wireless access point (AP) device end, an original management frame that carries a target information element is constructed, where the target information element includes an information element related to communication channel management. For each client connected to the AP device, a target address of the constructed original management frame is set to a media access control (MAC) address of the client, and information in the target information element is encrypted by using a key corresponding to the client, to obtain an encrypted management frame. Then, the encrypted management frame is sent. Therefore, encrypted transmission of information related to communication channel management is implemented between the AP device and the client, an attacker is prevented from forging and replaying the information that is related to communication channel management and that is carried in the management frame, and security of WiFi communication is improved.

According to a first aspect, a communication channel management method is provided, performed by a wireless access point (AP) device, and including: constructing an original management frame that carries a target information element, where the target information element includes an information element related to communication channel management; and when it is determined that one or more clients are connected to the AP device, performing the following steps for each client among the one or more connected clients: setting a destination address of the original management frame to a MAC address of the client; encrypting information in the target information element by using a key corresponding to the client, to obtain an encrypted management frame; and sending the encrypted management frame in a WiFi network, so that a connected client in the WiFi network determines, based on the destination address, whether to process the received management frame.

In an embodiment, the method further includes: broadcasting the original management frame in the WiFi network when it is determined that no client establishes a connection to the AP device.

In an embodiment, the encrypting information in the target information element by using a key corresponding to the client includes: obtaining a dedicated key generated in a handshake process when establishing a connection to the client; and encrypting the information in the target information element by using the dedicated key.

In an embodiment, the target information element is stored in a tag-length-value data format; and the encrypting information in the target information element by using a key corresponding to the client includes: encrypting a value in the target information element by using the key corresponding to the client.

In an embodiment, the original management frame includes a beacon frame and a probe response frame.

In an embodiment, the target information element includes one of the following: a channel switch announcement element, a channel switch wrapper element, a wide bandwidth channel switch element, a mesh channel switch parameters element, a channel switch timing element, a max channel switch time element, and a future channel guidance element.

In an embodiment, when the original management frame is a beacon frame and the target information element is a channel switch announcement element, the method further includes: in response to determining that channel switch is completed, sending, in the WiFi network, a beacon frame whose destination address is a broadcast address and that carries no channel switch announcement element.

According to a second aspect, a communication channel management method is provided, performed by a client, and including: receiving an encrypted management frame sent by a wireless access point (AP) device, where the encrypted management frame carries an encrypted target information element, and the target information element includes an information element related to communication channel management; determining, based on a destination address of the encrypted management frame, whether to process the encrypted management frame; in response to determining to process the encrypted management frame, decrypting the target information element by using a pre-stored key; and managing a communication channel based on a decryption result.

In an embodiment, the determining, based on a destination address of the encrypted management frame, whether to process the encrypted management frame includes: when the destination address of the encrypted management frame is a MAC address of the client, determining to process the encrypted management frame.

In an embodiment, the decrypting the target information element by using a pre-stored key includes: decrypting the target information element by using a dedicated key generated in a handshake process when establishing a connection to the wireless access point (AP) device.

In an embodiment, the encrypted management frame is an encrypted beacon frame, and the target information element is a channel switch announcement element; and the managing a communication channel based on a decryption result includes: performing channel switch based on the channel switch announcement element obtained through decryption.

According to a third aspect, a communication channel management apparatus is provided, disposed in a wireless access point (AP) device, and including: a construction unit, configured to construct an original management frame that carries a target information element, where the target information element includes an information element related to communication channel management; and an execution unit, configured to: when it is determined that one or more clients are connected to the AP device, perform predetermined steps for each client among the one or more connected clients, where the execution unit includes: a setting module, configured to set a destination address of the original management frame to a MAC address of the client; an encryption module, configured to encrypt information in the target information element by using a key corresponding to the client, to obtain an encrypted management frame; and a sending module, configured to send the encrypted management frame in a WiFi network, so that a connected client in the WiFi network determines, based on the destination address, whether to process the received management frame.

According to a fourth aspect, a communication channel management apparatus is provided, disposed in a client, and including: a receiving unit, configured to receive an encrypted management frame sent by a wireless access point (AP) device, where the encrypted management frame carries an encrypted target information element, and the target information element includes an information element related to communication channel management; a determining unit, configured to determine, based on a destination address of the encrypted management frame, whether to process the encrypted management frame; a decryption unit, configured to: in response to determining to process the encrypted management frame, decrypt the target information element by using a pre-stored key; and a management unit, configured to manage a communication channel based on a decryption result.

According to a fifth aspect, a computer-readable storage medium is provided, storing a computer program, where when the computer program is executed by a processor, the method according to any one of the first aspect is implemented.

According to a sixth aspect, a wireless access point (AP) device is provided, including a memory and a processor, where the memory stores executable code, and when the processor executes the executable code, the method according to any one of the first aspect is implemented.

According to a seventh aspect, a computer-readable storage medium is provided, storing a computer program, where when the computer program is executed in a computer, the computer is enabled to perform the method according to any one of the second aspect.

According to an eighth aspect, a terminal device is provided, including a memory and a processor, where the memory stores executable code, and when the processor executes the executable code, the method according to any one of the second aspect is implemented.

According to the communication channel management method and apparatus provided in the embodiments of the specification, at a wireless access point (AP) device end, first, an original management frame that carries a target information element is constructed, where the target information element includes an information element related to communication channel management. For each client connected to the AP device, a target address of the constructed original management frame is set to a MAC address of the client, and information in the target information element is encrypted by using a key corresponding to the client, to obtain an encrypted management frame. Then, the encrypted management frame is sent. Because the AP device uses different keys for different clients in an encryption process, the client can only obtain, through decryption, information in a target information element in a management frame whose destination address is the same as the MAC address of the client, but cannot obtain, through decryption, information in a target information element in another management frame. Therefore, encrypted transmission of information related to communication channel management is implemented between the AP device and the client, an attacker is prevented from forging and replaying the information that is related to communication channel management and that is carried in the management frame, and security of WiFi communication is improved.

BRIEF DESCRIPTION OF DRAWINGS

FIG. 4 is a schematic diagram illustrating a format of CSA;

DESCRIPTION OF EMBODIMENTS

The following further describes in detail technical solutions provided in this specification by using the accompanying drawings and embodiments. It can be understood that the specific embodiment described here is merely used to explain the related invention, but impose no limitation on the invention. In addition, it is also worthwhile to note that, for ease of description, only a part related to the related invention is shown in the accompanying drawings. It is worthwhile to note that, embodiments of this specification and features in the embodiments can be mutually combined if they do not conflict with each other.

Figure 1:
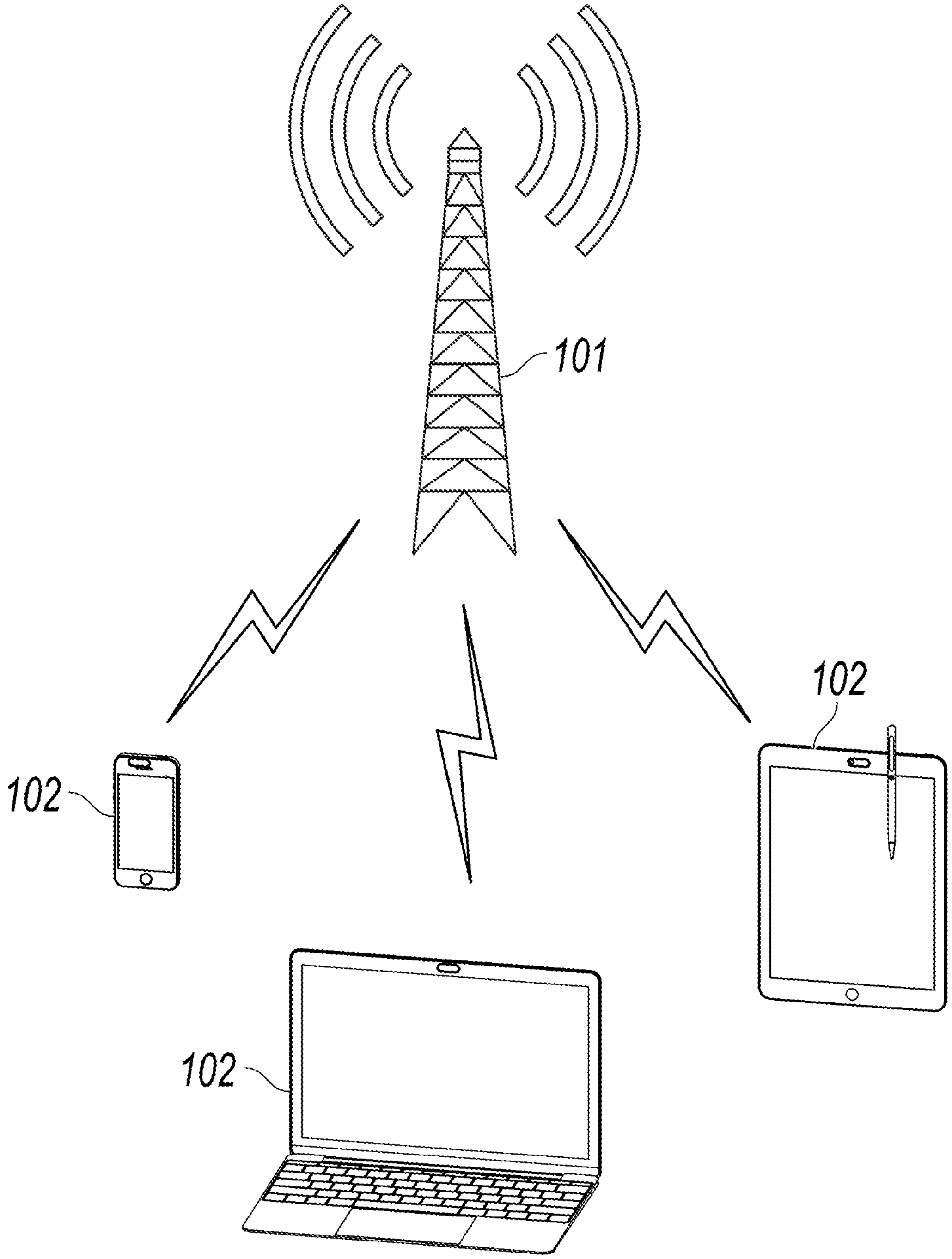
FIG. 1 is a schematic diagram illustrating an implementation scenario, according to an embodiment disclosed in this specification.

FIG. 1 is a schematic diagram illustrating an implementation scenario, according to an embodiment disclosed in this specification. As shown in FIG. 1, in the implementation scenario in FIG. 1, a wireless AP device 101 and a plurality of clients 102 are included. When the wireless AP device 101 needs to manage a communication channel (for example, switch a channel), to notify the connected clients 102, an original management frame that carries a target information element is constructed, where the target information element includes an information element related to communication channel management. For each client 102 among the connected clients 102, a destination address of the constructed original management frame is set to a MAC address of the client 102, and information in the target information element is encrypted by using a key corresponding to the client 102, to obtain an encrypted management frame. Due to open characteristic of a WiFi network, a data frame transmitted in the WiFi network is received by all clients 102 in the network. Therefore, to prevent encrypted information in the management frame from being cracked by another client, different keys are used for different clients during encryption. Finally, the wireless AP device 101 sends, in the WiFi network, the encrypted management frame obtained after address setting and encryption. After receiving the encrypted management frame, the client 102 in the WiFi network determines whether the destination address of the encrypted management frame is the same as the MAC address of the client 102. If the destination address of the encrypted management frame is the same as the MAC address of the client 102, the target information element in the encrypted management frame is decrypted and parsed by using a pre-stored key, to finally obtain information related to communication channel management, and manage a communication channel based on the obtained information related communication channel management. Therefore, encrypted transmission of information related to communication channel management is implemented between the AP device 101 and the client 102, an attacker is prevented from forging and replaying the information that is related to communication channel management and that is carried in the management frame, and security of WiFi communication is improved. The following describes specific methods for executing the above-mentioned process.

Figure 2:
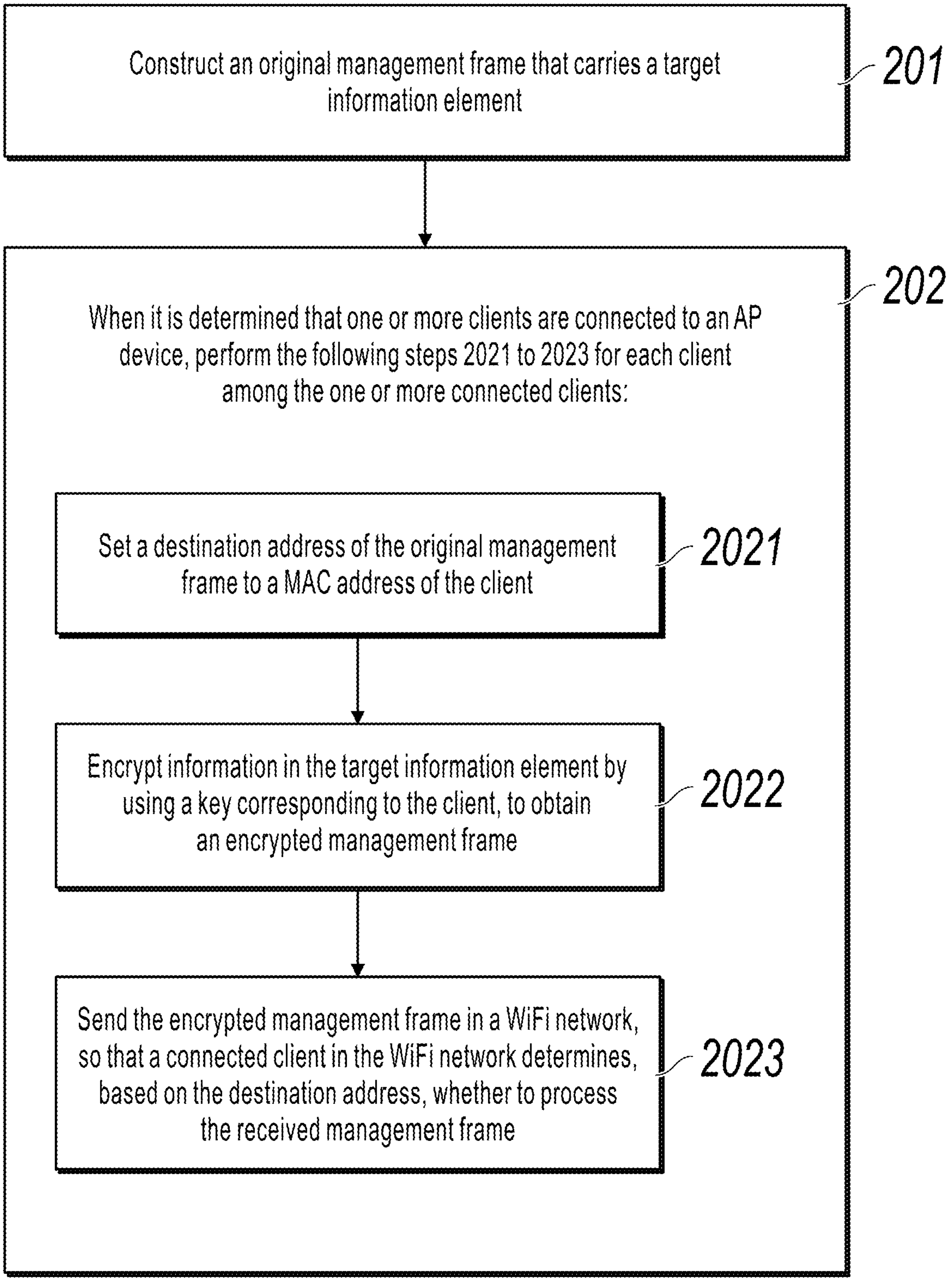
FIG. 2 is a schematic flowchart illustrating a communication channel management method, according to an embodiment.

FIG. 2 shows a communication channel management method, according to an embodiment. The method can be performed by a wireless access point (AP) device. For example, the AP device can include a wireless router. As shown in FIG. 2, the communication channel management method can include the following steps.

Step 201. Construct an original management frame that carries a target information element.

In this embodiment, the AP device can construct, as the original management frame, a management frame that carries the target information element. Here, the target information element can include an information element related to communication channel management.

In an embodiment, the original management frame can include a beacon frame and a probe response frame.

Generally, a wireless client can obtain surrounding wireless network information through passive scanning and active scanning. Passive scanning means that the client obtains wireless network information by eavesdropping on a beacon frame periodically sent by the AP device. Active scanning means that the client actively sends a probe request frame, and obtains a network signal by using a probe response frame returned by the AP device for the probe request frame.

Figure 3:
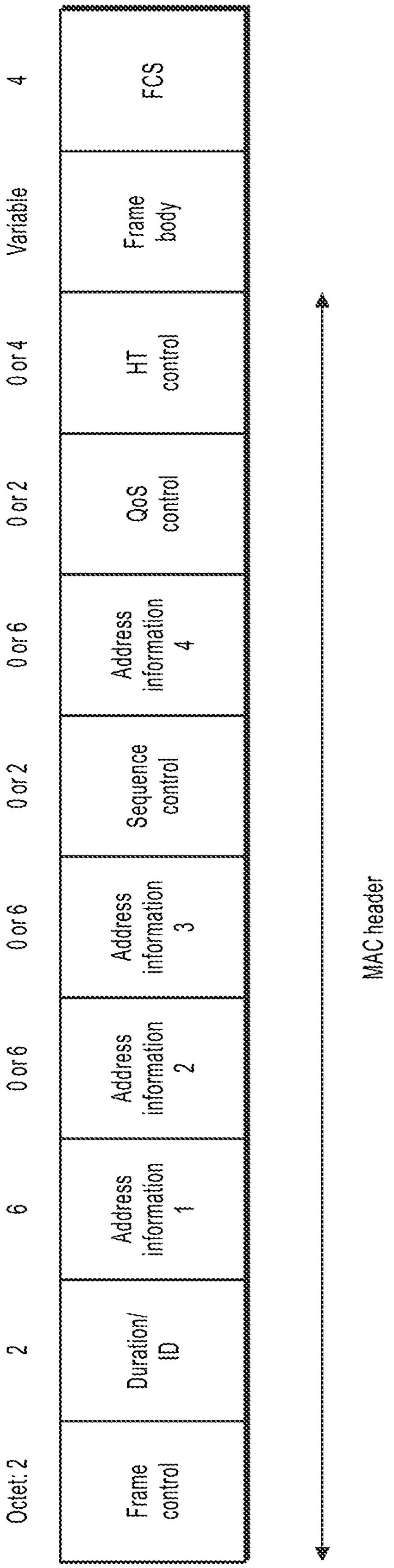
FIG. 3 is a schematic diagram illustrating a main structure of a beacon frame.

The beacon frame is one of management frames in a wireless local area network based on IEEE 802.11, and includes network description information. The beacon frame is periodically transmitted by a wireless access point (AP) device in a basic service set (BSS). The beacon frame is used to announce existence of a wireless local area network and synchronize members in the basic service set. FIG. 3 is a schematic diagram illustrating a main structure of a beacon frame. It can be understood that a digit above a box in the figure can represent space occupied by information, the space is in a unit of octet, and octets is the plural form of octet. As shown in FIG. 3, the beacon frame includes a 802.11 MAC header, a variable-length frame body, and a frame check sequence (FCS). For example, the MAC header can include the following content: frame control, duration/ID, address information, sequence control, quality of service control (QoS Control), high-throughput (HT) control (HT Control), etc. The frame body part of the beacon frame can include a fixed-length field and a plurality of information elements. The fixed-length field can include a timestamp, a beacon interval, capability information, etc.

Similar to the structure of the beacon frame, a frame body part of the probe response frame can also include a fixed-length field and a plurality of information elements.

Figure 4:
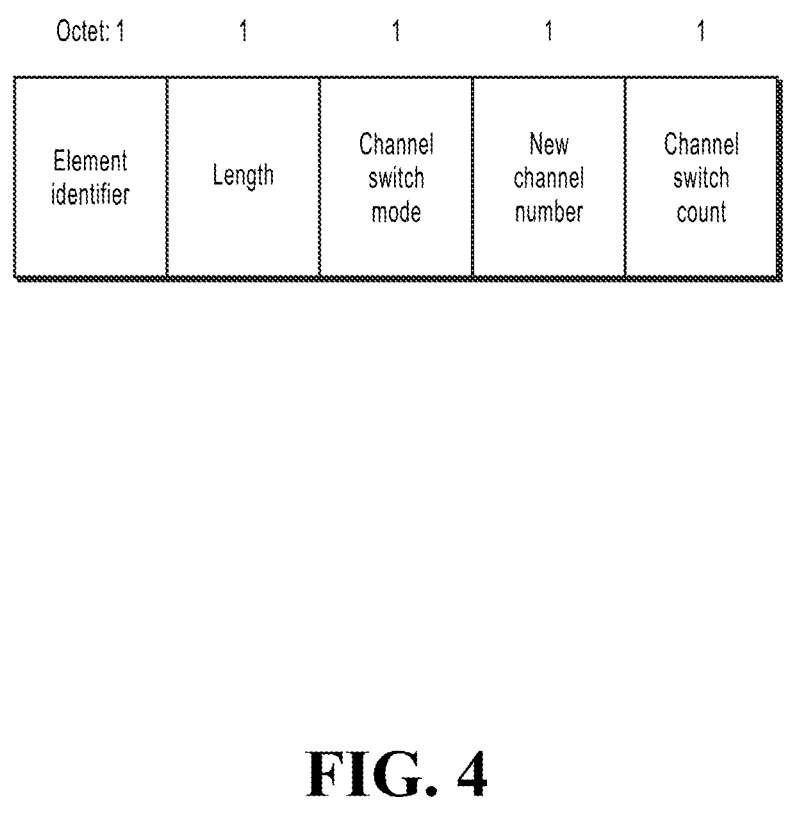

In an embodiment, the target information element can include one of the following: a channel switch announcement (CSA) element, a channel switch wrapper element, a wide bandwidth channel switch element, a mesh channel switch parameters element, a channel switch timing element, a max channel switch time element, and a future channel guidance element. The target information element can be related to communication channel management. For example, to warn the client in a WiFi network that a channel is to be changed, the AP can add a corresponding CSA field into a management frame (for example, a beacon frame or a probe response frame) to notify the client of a channel to which the AP is to switch, so that the client switches to a new channel in a timely manner. FIG. 4 is a schematic diagram illustrating a format of CSA. As shown in FIG. 4, the CSA includes an element identifier, a length, a channel switch mode, a new channel number, and a channel switch count. It can be understood that functions and formats of the target information element are described and recorded in detail in the 802.11 technical standard of the WiFi wireless network, and details are omitted here for simplicity. Based on an actual need, all the above-mentioned target information elements can appear in the beacon frame and the probe response frame.

For example, constructing a management frame that carries a target information element can mean writing the target information element into a frame body of the management frame, to obtain a management frame that carries the target information element.

Step 202. When it is determined that one or more clients are connected to the AP device, perform the following steps 2021 to 2023 for each client among the one or more connected clients. Details are as follows:

Step 2021. Set a destination address of the original management frame to a MAC address of the client.

In this embodiment, for each client connected to the AP device, the AP device can set, to the MAC address of the client, the destination address of the original management frame that carries the target information element.

Step 2022. Encrypt information in the target information element by using a key corresponding to the client, to obtain an encrypted management frame.

In this embodiment, a group of keys can be exchanged or negotiated in advance between the AP device and each client connected to the AP device. For example, the key can be a symmetric key, or can be an asymmetric key. To prevent encrypted information in the management frame from being cracked, different clients correspond to different keys.

In an embodiment, step 2022 can be further specifically implemented as follows: First, a dedicated key generated in a handshake process when establishing a connection to the client is determined as the key corresponding to the client. Then, the information in the target information element is encrypted by using the dedicated key.

Figure 5:
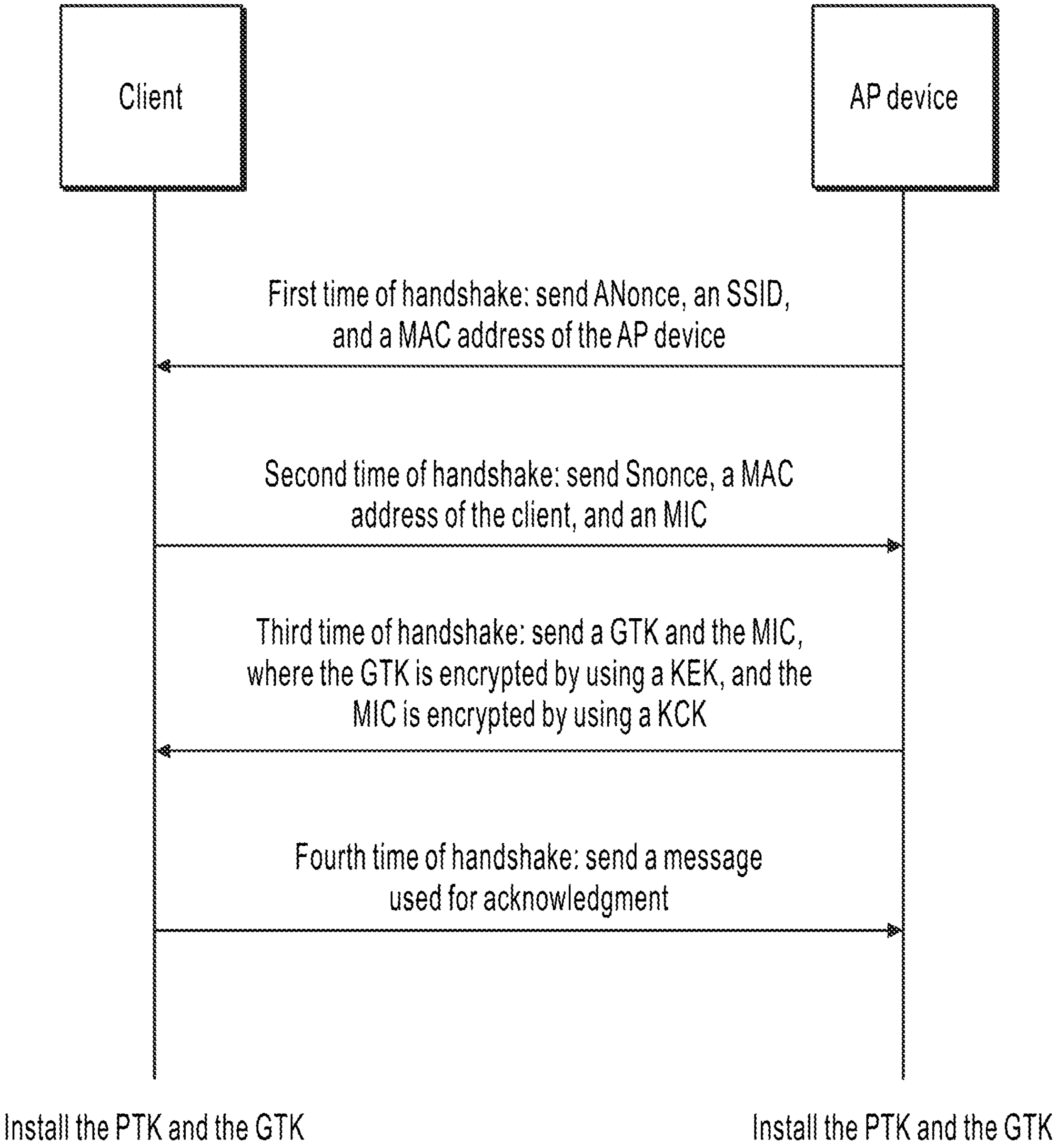
FIG. 5 is a schematic flowchart illustrating a four-way handshake process.

Generally, when the AP device establishes a connection to the client, a key is exchanged by using a handshake process. After the process succeeds, a key for communication between the AP device and the client is generated, and is used to encrypt communication data. A four-way handshake process is used as an example. FIG. 5 is a schematic flowchart illustrating a four-way handshake process. As shown in FIG. 5, a specific process includes the following steps.

In the first time of handshake, the AP device generates a random number ANonce, and sends information such as ANonce, a service set identifier (SSID), and a MAC address of the AP device to the client. After receiving the information, the client can calculate a pairwise transient key (PTK). The PTK can be calculated by using the following equation (1):

$$PTK=HMAC(PMK+ANonce+SNonce+MAC_A+MAC_s) \tag{1}$$

where HMAC represents an HMAC algorithm, SNonce is the random number generated by the client, $MAC_A$ represents the MAC address of the AP device, and $MAC_s$ represents the MAC address of the client. Here, the PMK is related to an authentication method. If a pre-shared key (PSK) authentication method is used, the PMK is calculated by using the following equation (2):

$$PMK=PBKDF2(Passphrase,SSID) \tag{2}$$

where PBKDF2 represents a PBKDF2 algorithm, and Passphrase represents a login password entered by a user.

In the second time of handshake, the client sends information such as SNonce, the MAC address of the client, and a message integrity code (MIC) to the AP device. After receiving the information, the AP device also calculates a value of the PTK by using the equation (1).

In the third time of handshake, the AP device sends, to the client, a message that carries a group transient key (GTK) and the MIC. The GTK is encrypted by using a key encryption key (KEK), and the KEK is used to encrypt a key generation message. The MIC is encrypted by using a key confirmation key (KCK), and the MIC is used to calculate integrity of the key generation message. After receiving the above-mentioned message, the client verifies the MIC. If the verification succeeds, the client obtains the GTK.

In the fourth time of handshake, the client sends, to the AP device, a message used for acknowledgment. The AP device successfully authenticates the message, and the PTK and the GTK are installed on both the AP device and the client. It can be understood that this specification merely briefly describes the four-way handshake process, calculation in an actual handshake process is more complex, and details are omitted here for simplicity.

In this embodiment, the AP device can determine, as the key corresponding to the client, the PTK generated in the four-way handshake process with the client, and encrypt the information in the target information element by using the PTK. Compared with the GTK shared by a plurality of clients, the PTK is a dedicated key negotiated between the AP device and a single client, and different dedicated keys are negotiated between all the clients and the AP. In this implementation, the dedicated key generated in the handshake process can be reused to encrypt the information without additionally exchanging or negotiating about the key, thereby simplifying a key determining step and improving efficiency.

Figure 6:
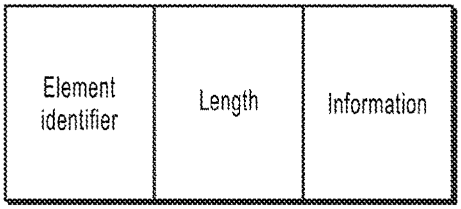
FIG. 6 is a schematic diagram illustrating a TLV data format.

In an embodiment, the target information element can be stored in a tag-length-value (TLV) data format. FIG. 6 is a schematic diagram illustrating a TLV data format. As shown in FIG. 6, the target information element represented in the TLV data format includes an element identifier, a length, and information. The element identifier, the length, and the information respectively correspond to the tag, length, and value in the TLV data format.

Based on the data format of the target information element, step 2022 can be further specifically implemented as follows: encrypting a value in the target information element by using the key corresponding to the client. For example, the target information element is CSA. Only the channel switch mode, the new channel number, and the channel switch count need to be encrypted. In this implementation, only the value in the target information element is encrypted, and there is no need to encrypt all the information in the target information element. Therefore, a calculation amount of data in an encryption process and a decryption process is reduced while it is ensured that a value is not disclosed, thereby improving efficiency.

Step 2023. Send, in the WiFi network, the encrypted management frame obtained after address setting and encryption processing, so that the connected client in the WiFi network determines, based on the destination address, whether to process the received management frame.

In this embodiment, the AP device can send, in the WiFi network, the encrypted management frame obtained after address setting and encryption processing. Due to open characteristic of the WiFi network, all the clients in the WiFi network can receive the encrypted management frame. The connected client in the WiFi network can determine, based on the destination address of the encrypted management frame, whether to process the received encrypted management frame. Specifically, the client can determine whether the destination address of the encrypted management frame is the same as the MAC address of the client. If the destination address of the encrypted management frame is the same as the MAC address of the client, the client performs operations such as decryption and parsing on the management frame, and manages the channel based on the information that is related to communication channel management and that is obtained through decryption and parsing. For example, when the target information element is a channel switch announcement element, channel switch can be performed based on the channel switch announcement obtained through decryption and parsing.

In an embodiment, the communication channel management method can further include the following step not shown in FIG. 2: broadcasting the original management frame in the WiFi network when it is determined that no client establishes a connection to the AP device.

In this embodiment, if no client establishes a connection to the AP device, the AP device can set the destination address of the constructed original management frame (for example, a beacon frame) to a broadcast address, and broadcast the original management frame in the WiFi network, where the original management frame carries an original and unencrypted target information element. The beacon frame is used as an example. When no client is connected to the AP device, the sent beacon frame can be an unencrypted beacon frame.

In an embodiment, when the original management frame is a beacon frame and the target information element is a channel switch announcement element, the communication channel management method can further include the following step shown in FIG. 2: in response to determining that channel switch is completed, sending, in the WiFi network, a beacon frame whose destination address is a broadcast address and that carries no channel switch announcement element.

In this embodiment, after the AP device and the client complete channel switch based on information in the channel switch announcement element, the AP device continues to send, in the WiFi network, a beacon frame whose destination address is a broadcast address and that carries no channel switch announcement element, to announce existence of the wireless local area network.

Figure 7:
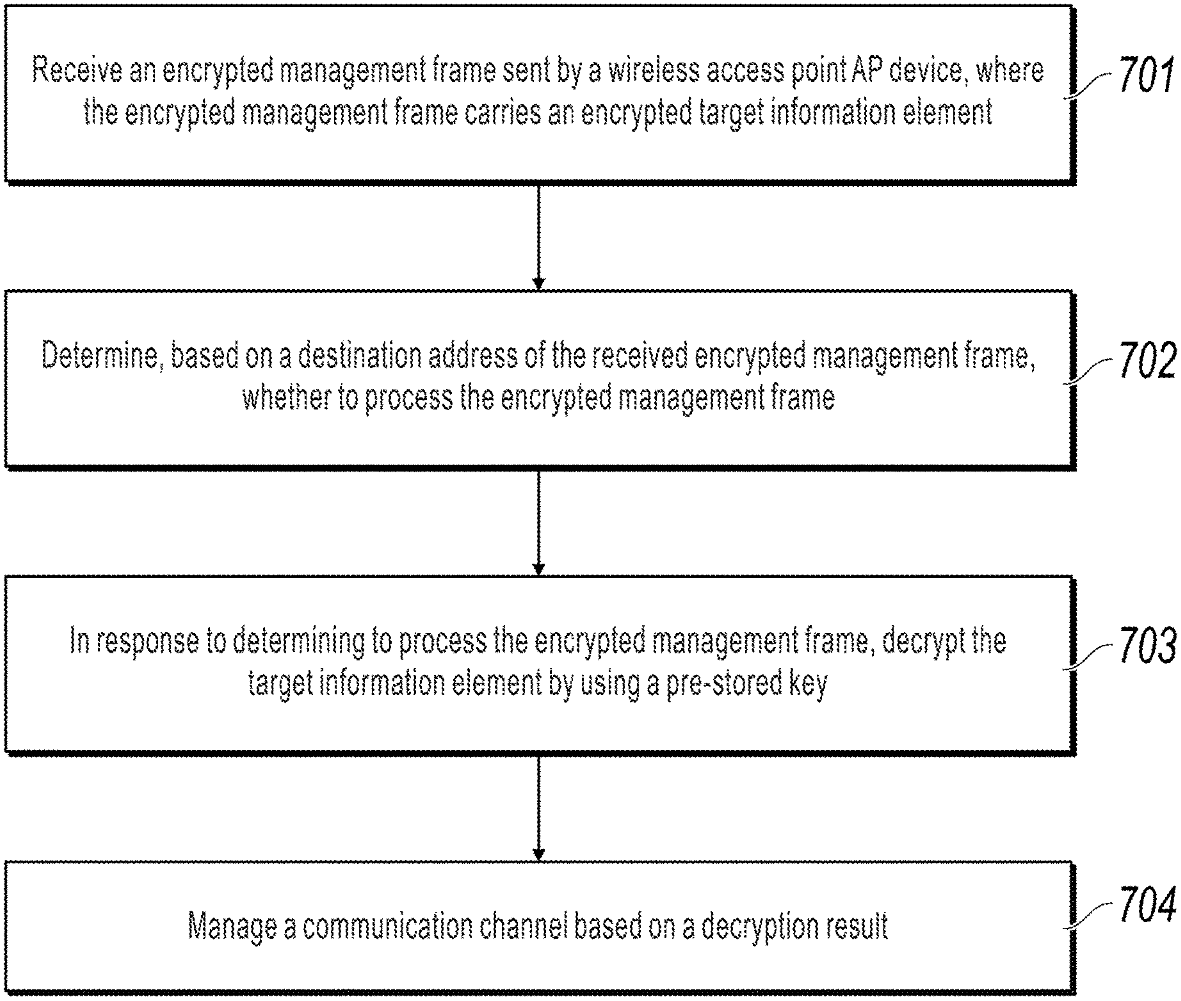
FIG. 7 is a schematic flowchart illustrating a communication channel management method, according to another embodiment.

FIG. 7 is a schematic flowchart illustrating a communication channel management method, according to an embodiment. The method can be performed by a client. Here, the client can be various devices that can establish a connection to a WiFi network, including but not limited to a smartphone, a platform computer, an e-book reader, and a notebook computer. As shown in FIG. 7, the communication channel management method can include the following steps.

Step 701. Receive an encrypted management frame sent by a wireless access point (AP) device, where the encrypted management frame carries an encrypted target information element.

In this embodiment, the client can receive the management frame that is sent by the connected wireless access point (AP) device and that carries the encrypted target information element. Here, the management frame can include a beacon frame and a probe response frame. The target information element can include an information element related to communication channel management. For example, the target information element can include one of the following: a channel switch announcement (CSA) element, a channel switch announcement (CSA) element, a channel switch wrapper element, a wide bandwidth channel switch element, a mesh channel switch parameters element, a channel switch timing element, a max channel switch time element, and a future channel guidance element. The target information element is located in a frame body part of the management frame.

Step 702. Determine, based on a destination address of the received encrypted management frame, whether to process the encrypted management frame.

In this embodiment, for each client connected to the AP device, the AP device can set, to the MAC address of the client, the destination address of the encrypted management frame that carries the encrypted target information element. As such, the client in the WiFi network can determine, based on the destination address of the received encrypted management frame, whether the received encrypted management frame is sent by the AP device for the client. If yes, the client processes the encrypted management frame. Specifically, the client can determine whether the destination address of the received encrypted management frame is the same as the MAC address of the client. If the destination address of the received encrypted management frame is the same as the MAC address of the client, the client determines that the management frame is sent by the AP device for the client, to determine to process the encrypted management frame.

Step 703. In response to determining to process the encrypted management frame, decrypt the target information element by using a pre-stored key.

In this embodiment, a group of keys can be exchanged or negotiated in advance between the AP device and each client connected to the AP device. For example, the key can be a symmetric key, or can be an asymmetric key. To prevent encrypted information in the management frame from being cracked, different clients correspond to different keys. As such, if the client determines to process the received management frame, the client decrypts the target information element by using the pre-stored key exchanged or negotiated with the AP device. It can be understood that after decrypting the target information element, the client can further parse the management frame based on a current conventional method for parsing the management frame.

In an embodiment, the decrypting the target information element by using a pre-stored key can be specifically as follows: decrypting the target information element by using a dedicated key generated in a handshake process when establishing a connection to the wireless access point (AP) device.

Generally, when the AP device establishes a connection to the client, a key is exchanged by using a handshake process. After the process succeeds, a key for communication between the AP device and the client is generated, and is used to encrypt communication data. A four-way handshake process is used as an example. It can be seen from the descriptions in FIG. 5 that a pairwise transient key (PTK) is generated in the four-way handshake process, and is used as a dedicated key between an AP device and a single client.

In this embodiment, the client can decrypt the target information element by using the PTK generated in the four-way handshake process when the client establishes a connection to the AP device. In this implementation, the key generated in the handshake process can be reused to encrypt the information without additionally exchanging or negotiating about the key, thereby simplifying a key determining step and improving efficiency.

Step 704. Manage a communication channel based on a decryption result.

In this embodiment, the client manages the channel information based on the decryption result of the target information element and the parsing result of the management frame. For example, when the encrypted management frame is an encrypted beacon frame and the target information element is a channel switch announcement element, channel switch can be performed based on the channel switch announcement obtained through decryption and parsing.

According to the communication channel management method provided in the above-mentioned embodiments of this application, encrypted transmission of information related to communication channel management is implemented between the AP device and the client, an attacker is prevented from forging and replaying the information that is related to communication channel management and that is carried in the management frame, and security of WiFi communication is improved.

According to an embodiment of another aspect, a communication channel management apparatus is provided. The communication channel management apparatus can be disposed in a wireless access point (AP) device.

Figure 8:
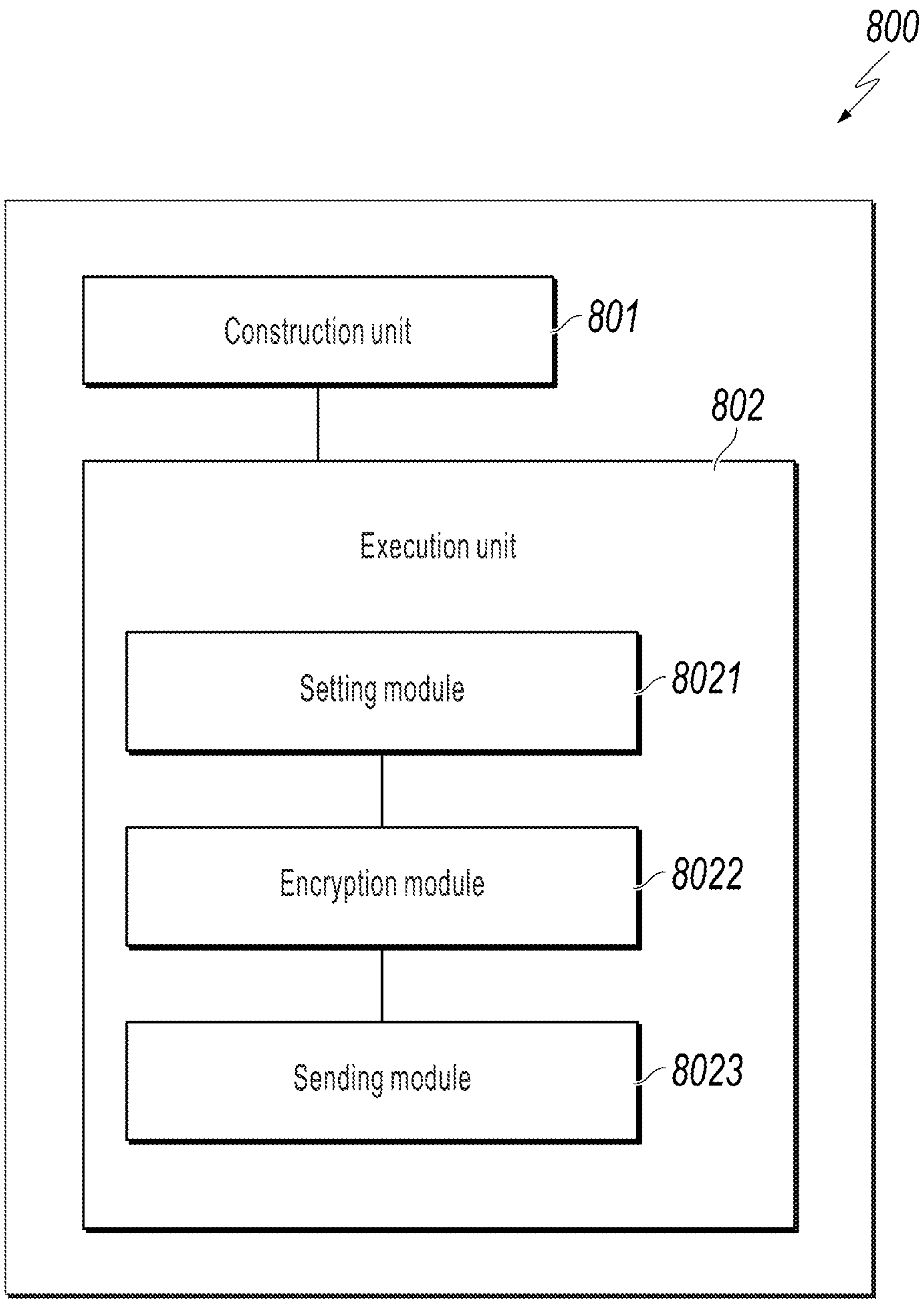
FIG. 8 is a schematic block diagram illustrating a communication channel management apparatus, according to an embodiment.

FIG. 8 is a schematic block diagram illustrating a communication channel management apparatus, according to an embodiment. As shown in FIG. 8, the communication channel management apparatus 800 includes: a construction unit 801, configured to construct an original management frame that carries a target information element, where the target information element includes an information element related to communication channel management; and an execution unit 802, configured to: when it is determined that one or more clients are connected to the AP device, perform predetermined steps for each client among the one or more connected clients, where the execution unit 802 includes: a setting module 8021, configured to set a destination address of the original management frame to a MAC address of the client; an encryption module 8022, configured to encrypt information in the target information element by using a key corresponding to the client, to obtain an encrypted management frame; and a sending module 8023, configured to send the encrypted management frame in a WiFi network, so that a connected client in the WiFi network determines, based on the destination address, whether to process the received management frame.

In some optional implementations of this embodiment, the apparatus 800 further includes a broadcast unit (not shown in the figure), configured to broadcast the original management frame in the WiFi network when it is determined that no client establishes a connection to the AP device.

In some optional implementations of this embodiment, the encryption module 8022 is further configured to obtain a dedicated key generated in a handshake process when establishing a connection to the client; and encrypt the information in the target information element by using the dedicated key.

In some optional implementations of this embodiment, the target information element is stored in a tag-length-value data format; and the encryption module 8022 is further configured to encrypt a value in the target information element by using the key corresponding to the client.

In some optional implementations of this embodiment, the original management frame includes a beacon frame and a probe response frame.

In some optional implementations of this embodiment, the target information element includes one of the following: a channel switch announcement element, a channel switch wrapper element, a wide bandwidth channel switch element, a mesh channel switch parameters element, a channel switch timing element, a max channel switch time element, and a future channel guidance element.

In some optional implementations of this embodiment, the apparatus 800 further includes a beacon frame sending unit (not shown in the figure), configured to: in response to determining that channel switch is completed, send, in the WiFi network, a beacon frame whose destination address is a broadcast address and that carries no channel switch announcement element.

According to an embodiment of another aspect, a communication channel management apparatus is provided. The communication channel management apparatus can be disposed in a client.

Figure 9:
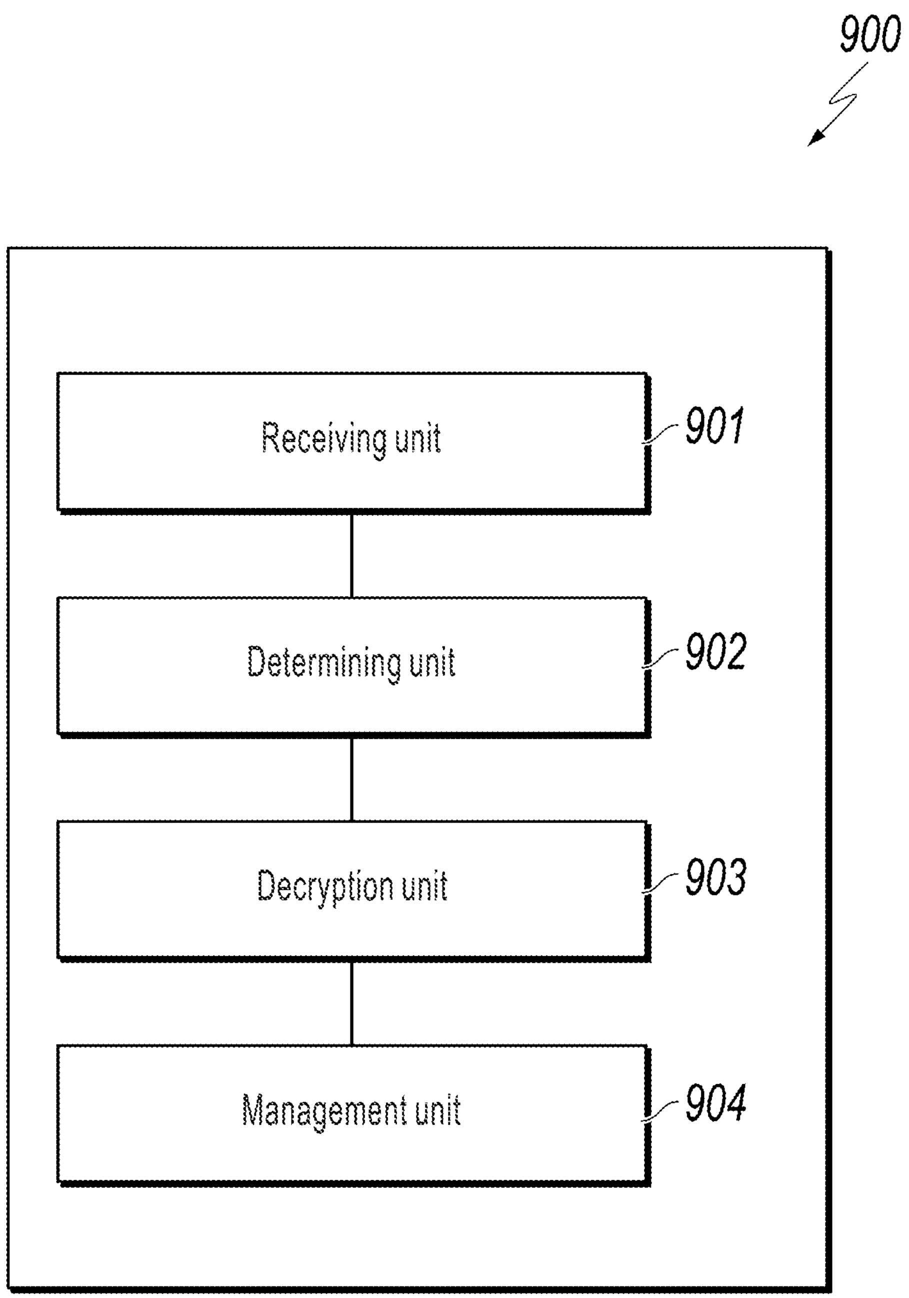
FIG. 9 is a schematic block diagram illustrating a communication channel management apparatus, according to another embodiment.

FIG. 9 is a schematic block diagram illustrating a communication channel management apparatus, according to another embodiment. As shown in FIG. 9, the communication channel management apparatus 900 includes: a receiving unit 901, configured to receive an encrypted management frame sent by a wireless access point (AP) device, where the encrypted management frame carries an encrypted target information element, and the target information element includes an information element related to communication channel management; a determining unit 902, configured to determine, based on a destination address of the encrypted management frame, whether to process the encrypted management frame; a decryption unit 903, configured to: in response to determining to process the encrypted management frame, decrypt the target information element by using a pre-stored key; and a management unit 904, configured to manage a communication channel based on a decryption result.

In some optional implementations of this embodiment, the determining unit 902 is further configured to: when the destination address of the encrypted management frame is a MAC address of the client, determine to process the encrypted management frame.

In some optional implementations of this embodiment, the decryption unit 903 is further configured to decrypt the target information element by using a dedicated key generated in a handshake process when establishing a connection to the wireless access point (AP) device.

In some optional implementations of this embodiment, the management unit 904 is further configured to perform channel switch based on the channel switch announcement element obtained through decryption.

According to an embodiment of another aspect, a computer-readable storage medium is further provided, storing a computer program, where when the computer program is executed by a processor, the method described in FIG. 2 is implemented.

According to an embodiment of still another aspect, a wireless access point (AP) device is further provided, including a memory and a processor, where the memory stores executable code, and when the processor executes the executable code, the method described in FIG. 2 is implemented.

According to an embodiment of another aspect, a computer-readable storage medium is further provided, storing a computer program, where when the computer program is executed in a computer, the computer is enabled to perform the method described in FIG. 7.

According to an embodiment of still another aspect, a terminal device is further provided, including a memory and a processor, where the memory stores executable code, and when the processor executes the executable code, the method described in FIG. 7 is implemented.

A person of ordinary skill in the art should be further aware that, in combination with examples described in embodiments disclosed in this specification, units and algorithm steps can be implemented by using electronic hardware, computer software, or a combination thereof. To clearly describe interchangeability between the hardware and the software, compositions and steps of each example are generally described in the above-mentioned descriptions based on functions. Whether a function is executed by hardware or software depends on a specific application and design constraint condition of a technical solution. A person of ordinary skill in the art can use different methods to implement the described functions for each particular application, but it should not be considered that the implementation goes beyond the scope of this application.

Steps of methods or algorithms described in the embodiments disclosed in this specification can be implemented by hardware, a software module executed by a processor, or a combination thereof. The software module can reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The above-mentioned specific implementations further describe in detail the objectives, technical solutions, and beneficial effects of this specification. It should be understood that the descriptions above are merely specific implementations of this specification, and are not intended to limit the protection scope of this specification. Any modifications, equivalent replacements, or improvements made without departing from the spirit and principle of this specification shall fall within the protection scope of this specification.

What is claimed is:

1. A computer-implemented method for communication channel management, comprising:
performed by a wireless access point (AP) device in an open wireless local area network (WLAN):
constructing an original management frame that carries information elements in a target information element, wherein the target information element comprises an information element related to communication channel management and the information element comprises at least one of:
a channel switch announcement element, a channel switch wrapper element, a wide bandwidth channel switch element, a mesh channel switch parameters element, a channel switch timing element, a max channel switch time element, and a future channel guidance element; and
when a determination is reached that one or more clients are connected to the AP device, performing, for each client of the one or more clients:
setting a destination address of the original management frame to a media access control (MAC) address of the client;
encrypting, to obtain an encrypted management frame by using a key unique to the client, only part of the information elements in the target information element while leaving at least part of the information elements unencrypted, wherein the key unique to the client is generated using a four-way handshake process between the client and the AP device; and
sending the encrypted management frame in the open WLAN, so that a connected client in the open WLAN determines, based on the destination address, whether to process the encrypted management frame.

2. The computer-implemented method of claim 1, comprising:
broadcasting the original management frame in the open WLAN when no client is determined to have established a connection to the AP device.

3. The computer-implemented method of claim 1, wherein encrypting, to obtain an encrypted management frame by using a key corresponding to the client, information in the target information element, wherein the key corresponding to the client is generated using a four-way handshake process between the client and the AP device, comprises:
obtaining a dedicated key generated in the four-way handshake process when establishing a connection to the client; and
encrypting the information in the target information element by using the dedicated key.

4. The computer-implemented method of claim 1, wherein:
the target information element is stored in a tag-length-value data format; and
the encrypting, to obtain an encrypted management frame by using a key corresponding to the client, information in the target information element, wherein the key corresponding to the client is generated using a four-way handshake process between the client and the AP device, comprises:
encrypting a value in the target information element by using the key corresponding to the client.

5. The computer-implemented method of claim 1, wherein the original management frame comprises a beacon frame and a probe response frame.

6. The computer-implemented method of claim 1, comprising:
when the original management frame is a beacon frame and the target information element is a channel switch announcement element:
in response to determining that channel switch is completed, sending, in the open WLAN, a beacon frame whose destination address is a broadcast address and that carries no channel switch announcement element.

7. A non-transitory, computer-readable medium storing one or more instructions executable by a computer system to perform operations for communication channel management, comprising:
performing by a wireless access point (AP) device in an open wireless local area network (WLAN):
constructing an original management frame that carries information elements in a target information element, wherein the target information element comprises an information element related to communication channel management and the information element comprises at least one of:
a channel switch announcement element, a channel switch wrapper element, a wide bandwidth channel switch element, a mesh channel switch parameters element, a channel switch timing element, a max channel switch time element, and a future channel guidance element; and
when a determination is reached that one or more clients are connected to the AP device, performing, for each client of the one or more clients:
setting a destination address of the original management frame to a media access control (MAC) address of the client;
encrypting, to obtain an encrypted management frame by using a key unique to the client, only part of the information elements in the target information element while leaving at least part of the information elements unencrypted, wherein the key unique to the client is generated using a four-way handshake process between the client and the AP device; and
sending the encrypted management frame in the open WLAN, so that a connected client in the open WLAN determines, based on the destination address, whether to process the encrypted management frame.

8. The non-transitory, computer-readable medium of claim 7, comprising:

broadcasting the original management frame in the open WLAN when no client is determined to have established a connection to the AP device.

9. The non-transitory, computer-readable medium of claim 7, wherein encrypting, to obtain an encrypted management frame by using a key corresponding to the client, information in the target information element, wherein the key corresponding to the client is generated using a four-way handshake process between the client and the AP device, comprises:

obtaining a dedicated key generated in the four-way handshake process when establishing a connection to the client; and encrypting the information in the target information element by using the dedicated key.

10. The non-transitory, computer-readable medium of claim 7, wherein:

the target information element is stored in a tag-length-value data format; and the encrypting, to obtain an encrypted management frame by using a key corresponding to the client, information in the target information element, wherein the key corresponding to the client is generated using a four-way handshake process between the client and the AP device, comprises:

encrypting a value in the target information element by using the key corresponding to the client.

11. The non-transitory, computer-readable medium of claim 7, wherein the original management frame comprises a beacon frame and a probe response frame.

12. The non-transitory, computer-readable medium of claim 7, comprising:

when the original management frame is a beacon frame and the target information element is a channel switch announcement element:

in response to determining that channel switch is completed, sending, in the open WLAN, a beacon frame whose destination address is a broadcast address and that carries no channel switch announcement element.

13. A computer-implemented system for communication channel management, comprising:

one or more computers; and one or more computer memory devices interoperably coupled with the one or more computers and having tangible, non-transitory, machine-readable media storing one or more instructions that, when executed by the one or more computers, perform one or more operations comprising:

performing by a wireless access point (AP) device in an open wireless local area network (WLAN):

constructing an original management frame that carries information elements in a target information element, wherein the target information element comprises an information element related to communication channel management and the information element comprises at least one of:

a channel switch announcement element, a channel switch wrapper element, a wide bandwidth channel switch element, a mesh channel switch parameters element, a channel switch timing element, a max channel switch time element, and a future channel guidance element; and when a determination is reached that one or more clients are connected to the AP device, performing, for each client of the one or more clients:

setting a destination address of the original management frame to a media access control (MAC) address of the client;

encrypting, to obtain an encrypted management frame by using a key unique to the client, only part of the information elements in the target information element while leaving at least part of the information elements unencrypted, wherein the key unique to the client is generated using a four-way handshake process between the client and the AP device; and sending the encrypted management frame in the open WLAN, so that a connected client in the open WLAN determines, based on the destination address, whether to process the encrypted management frame.

14. The computer-implemented method of claim 13, comprising:

broadcasting the original management frame in the open WLAN when no client is determined to have established a connection to the AP device.

15. The computer-implemented system of claim 13, wherein encrypting, to obtain an encrypted management frame by using a key corresponding to the client, information in the target information element, wherein the key corresponding to the client is generated using a four-way handshake process between the client and the AP device, comprises:

obtaining a dedicated key generated in the four-way handshake process when establishing a connection to the client; and encrypting the information in the target information element by using the dedicated key.

16. The computer-implemented system of claim 13, wherein:

the target information element is stored in a tag-length-value data format; and the encrypting, to obtain an encrypted management frame by using a key corresponding to the client, information in the target information element, wherein the key corresponding to the client is generated using a four-way handshake process between the client and the AP device, comprises:

encrypting a value in the target information element by using the key corresponding to the client.

17. The computer-implemented system of claim 13, wherein the original management frame comprises a beacon frame and a probe response frame.

* * * * *